United States Patent
Spoltore et al.

(10) Patent No.: US 7,360,216 B2
(45) Date of Patent: Apr. 15, 2008

(54) METHOD AND SYSTEM FOR REAL-TIME MULTITASKING

(75) Inventors: Paul L. Spoltore, Fremont, CA (US); Ramana V. Katragadda, Carlsbad, CA (US)

(73) Assignee: NVIDIA Corporation, Santa Clara, CA (US)

( * ) Notice: Subject to any disclaimer, the term of this patent is extended or adjusted under 35 U.S.C. 154(b) by 734 days.

(21) Appl. No.: 10/189,791

(22) Filed: Jul. 3, 2002

(65) Prior Publication Data

US 2004/0015971 A1    Jan. 22, 2004

(51) Int. Cl.
*G06F 9/44* (2006.01)
*G06F 9/50* (2006.01)
(52) U.S. Cl. ..................... 718/102; 718/104
(58) Field of Classification Search ......... 718/100–108
See application file for complete search history.

(56) References Cited

U.S. PATENT DOCUMENTS

| | | | | |
|---|---|---|---|---|
| 5,325,525 A | * | 6/1994 | Shan et al. ................. | 718/104 |
| 5,619,695 A | * | 4/1997 | Arbabi et al. ............... | 718/100 |
| 6,434,590 B1 | * | 8/2002 | Blelloch et al. ............ | 718/102 |
| 2003/0061260 A1 | * | 3/2003 | Rajkumar ................... | 709/104 |
| 2004/0015973 A1 | * | 1/2004 | Skovira ...................... | 718/103 |

OTHER PUBLICATIONS

Verhoosel, J.P.C. et al. "A Static Scheduling Algorithm for Distributed Hard Real-Time Systems." The Journal of Real-Time Systems. 1991.*
Xu, Jia et al. "Scheduling Processes with Release Times, Deadlines, Precedence, and Exclusion Relations." IEEE. Mar. 1990.*
Rock, H. "Some New Results in Flow Shop Scheduling." Mar. 1983.*

\* cited by examiner

*Primary Examiner*—Lewis A. Bullock, Jr.
(74) *Attorney, Agent, or Firm*—Patterson & Sheridan, L.L.P.

(57) ABSTRACT

A method of selecting tasks for execution on a processing node is provided. A plurality of indications of execution times corresponding to a first plurality of tasks is received. Also, a plurality of indications of maximum allowable latencies corresponding to the first plurality of tasks is received. At least a subset of the first plurality of tasks is selected for execution on the processing node based on the plurality of indications of execution times and the plurality of indications of maximum allowable latencies.

20 Claims, 7 Drawing Sheets

US 7,360,216 B2

METHOD AND SYSTEM FOR REAL-TIME MULTITASKING

BACKGROUND OF THE INVENTION

This application is related in general to digital processing and more specifically to real-time digital processing.

Early real-time systems were often "hand crafted" in order to meet stringent timing constraints. In particular, real-time tasks that were to be executed concurrently were analyzed to determine their detailed timing requirements. Then, a real-time operating system was "built around" these tasks such that their timing requirements were satisfied. Because such real-time systems are tied so closely with the underlying tasks, they are not easily modifiable or extendible. For example, attempting to modify a task or add an additional task to the system could require a complete re-design of the system.

Real-time systems have since been developed that are more flexible than the "hand crafted" systems. These systems often employ one of two common methods for scheduling real-time tasks for execution: the "scheduled reservation" model and the "fixed priority" model.

Under the scheduled reservation model, the processor is viewed as a quantifiable resource that can be reserved like physical memory or disk blocks. But if two tasks require processor resources simultaneously, then one of the tasks will have to wait until the other is finished. If this task must wait too long, then it may not be able to execute in "real-time." Thus, the scheduled reservation model cannot guarantee real-time execution of all tasks. It is, however, much more flexible and extendible than "hand crafted" real-time systems.

Under the fixed priority model, each task is assigned a priority level by developers. During operation, tasks are executed strictly based on their priority level. For example, a task with a higher priority than that of an executing task can interrupt that task, whereas a task with a lower priority than that of the executing task must wait until the executing task finishes. As with the scheduled reservation model, the fixed priority model cannot guarantee real-time execution of tasks (except for the highest priority task), although it is much more flexible and extendible than "hand crafted" systems.

It is desirable to provide a real-time system that improves upon one or more of the above-mentioned (or other) shortcomings in the prior art.

BRIEF SUMMARY OF THE INVENTION

In one embodiment according to the present invention, a method of selecting tasks for execution on a processing node is provided. The method comprises receiving a plurality of indications of execution times corresponding to a first plurality of tasks, and receiving a plurality of indications of maximum allowable latencies corresponding to the first plurality of tasks. The method also comprises selecting at least a subset of the first plurality of tasks for execution on the processing node based on the plurality of indications of execution times and the plurality of indications of maximum allowable latencies.

In another embodiment according to the present invention, a further method of selecting tasks for execution on a processing node is provided. The method includes receiving a plurality of indications of execution times corresponding to a first plurality of tasks, and receiving a plurality of indications of maximum allowable latencies corresponding to the first plurality of tasks. The method additionally includes receiving a plurality of indications of required node resources corresponding to the first plurality of tasks and a second plurality of tasks. The method further includes selecting at least a subset of the first plurality of tasks and the second plurality of tasks for execution on the processing node based on the plurality of indications of execution times, the plurality of indications of maximum allowable latencies, and the plurality of indications of required node resources.

In yet another embodiment according to the present invention, a processing device having a plurality processing nodes for executing a plurality of tasks is provided. The processing device comprises a memory for storing a plurality of indications of execution times of at least a first plurality of tasks and a plurality of indications of maximum allowable latencies of at least the first plurality of tasks. The processing device also comprises a scheduler that determines corresponding sets of the plurality of tasks for execution by the plurality of processing nodes, wherein at least one of the corresponding sets is determined based on the plurality of indications of execution times and the plurality of indications of maximum allowable latencies.

In still another embodiment according to the present invention, a computer program product is provided, the computer program product including a computer readable storage medium having computer program code embodied therein for selecting tasks for execution on a processing node. The computer program code includes code for receiving a plurality of indications of execution times corresponding to a first plurality of tasks, and code for receiving a plurality of indications of maximum allowable latencies corresponding to the first plurality of tasks. The computer program product also includes code for selecting at least a subset of the first plurality of tasks for execution on the processing node based on the plurality of indications of execution times and the plurality of indications of maximum allowable latencies.

In yet another embodiment according to the present invention, a further computer program product is provided, the computer program product comprising computer readable storage medium having computer program code embodied therein for selecting tasks for execution on a processing node. The computer program code comprises code for receiving a plurality of indications of execution times corresponding to a first plurality of tasks, and code for receiving a plurality of indications of maximum allowable latencies corresponding to the first plurality of tasks. The computer program product additionally comprises code for receiving a plurality of indications of required node resources corresponding to the first plurality of tasks and a second plurality of tasks. The computer program product also comprises code for selecting at least a subset of the first plurality of tasks and the second plurality of tasks for execution on the processing node based on the plurality of indications of execution times, the plurality of indications of maximum allowable latencies, and the plurality of indications of required node resources.

DETAILED DESCRIPTION OF THE INVENTION

Overview

Embodiments according to the present invention provide techniques for scheduling tasks for real-time execution. In some specific embodiments, tasks are scheduled for execution on a plurality of processing nodes. In these embodiments, each of the of nodes is assigned one or more the tasks for execution. Processing nodes can include one or more of common types of processing resources such as general purpose processors, general purpose digital signal processors, special purpose processors, finite-state machines (FSMs), application-specific integrated circuits (ASICs), etc.

The time between when a task can begin to execute (e.g., when data becomes available, etc.) and when the task actually begins to execute will be referred to herein as "latency." For some tasks, it may be desired that the latency not exceed some maximum amount (herein referred to as the "maximum allowable latency"). Such tasks shall be herein referred to as "hard real-time tasks." In one embodiment, it may be desired that the maximum allowable latencies of hard real-time tasks never or rarely be exceeded. In other embodiments, it may be acceptable that that the maximum allowable latency of one or more hard real-time tasks is occasionally exceeded (e.g., 0.5%, 1%, 2% , etc. of the time).

With other tasks, a maximum allowable latency requirement is not necessary. Such tasks will be herein referred to as "soft real-time tasks." It is to be understood that "soft realtime tasks" can include tasks for which "real-time" execution is desired as well as tasks for which "non-realtime" execution is permissible.

A Configurable Device

Figure 1:
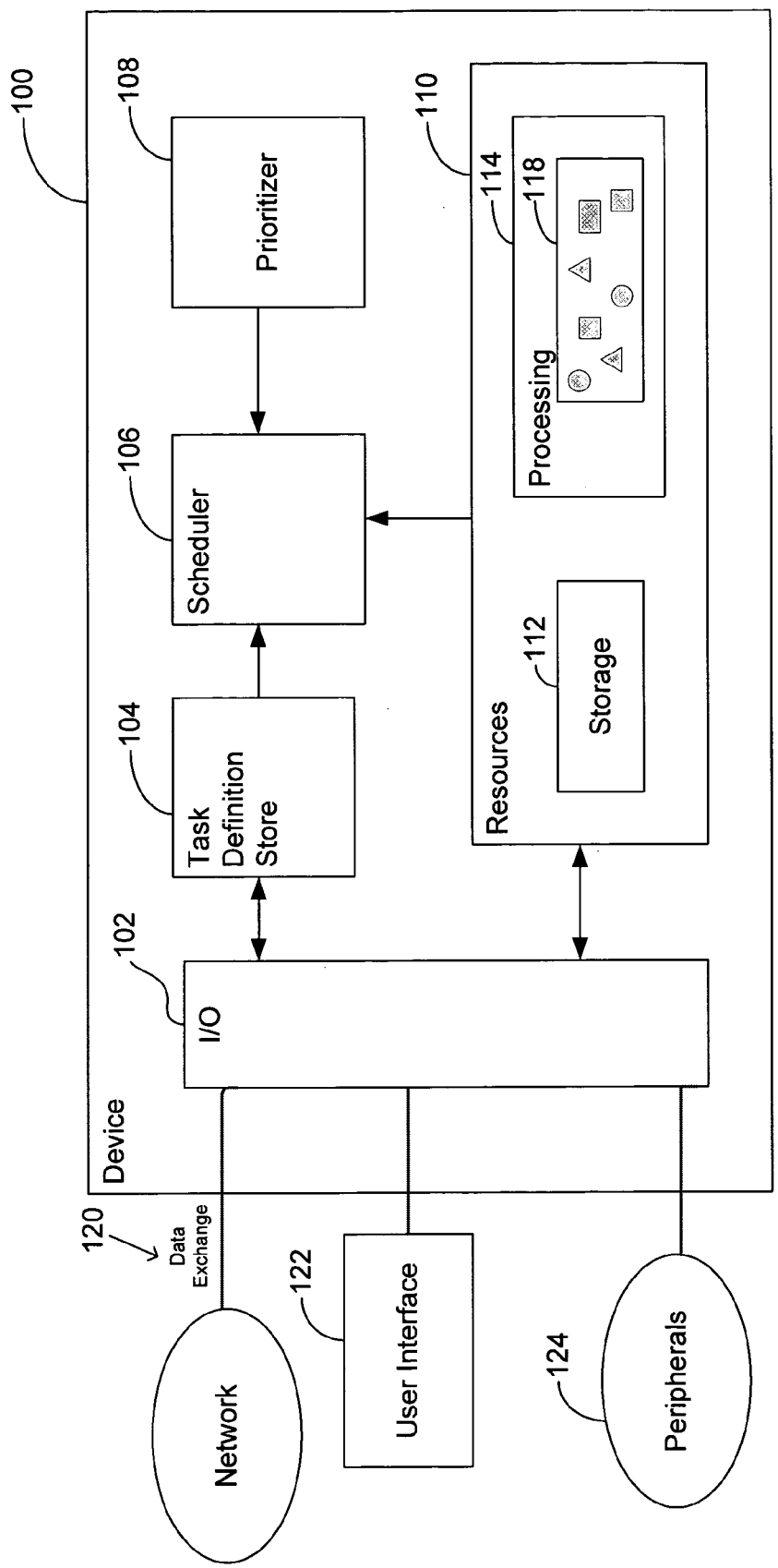
FIG. 1 is a simplified block diagram of a configurable device in which some embodiments of methods according to the present invention can be implemented.

FIG. 1 is a simplified block diagram of a device in which embodiments of the present invention can be implemented. It should be apparent, however, that aspects of the apparatus and methods described herein can be applied to many different types of computing architectures including, for example, general purpose processors, digital signal processors, custom integrated circuits, discrete circuits, etc. Additionally, aspects of the apparatus and methods described herein can be applied, in general, to any type of processing approach including, parallel processing, distributed processing, synchronous processing, asynchronous processing, etc.

Device 100 can be, for example, a consumer electronics device (or a component thereof) such as a cell phone, pager, personal digital assistant (PDA), global positioning system (GPS) receiver, etc. It should be apparent, however, that device 100 can be any type of device that can benefit from a processing engine.

Device 100 includes input/output (I/O) system 102 for providing data exchange with the external environment (illustrated at 120), connection to peripherals 124, and interaction with a human user via user interface 122. Data exchange includes exchanges with digital networks such as an internet, the Internet, an intranet, an extranet, communication infrastructures such as a telephone network, radio frequency exchanges as to wireless networks, etc. Any type of physical communication or data transfer network can be employed. Any type of protocol can be used to perform the communication.

User interface allows a human user to operate the device, and to perform other functions. Typically, a user interface includes a display screen and manual controls such as buttons, a pointing device (e.g., a mouse, trackball, touchpad, etc.), knobs, switches, and other types of controls. Additional output devices can include speakers, force feedback, etc. Peripherals 124 include storage devices such as disk drives, input/output devices such as keyboards, monitors, etc.

I/O system 102 can be in communication with different systems in device 100. For example, FIG. 1 shows I/O system 102 communicating with task definition store 104 and storage and processing resources 110. Other arrangements are possible.

Task definition store 104 is used to store programs, adaptation or configuration information, or other information used to control or manage the processing or functioning of device 100. In one embodiment, adaptation information is used to define tasks that are executed by systems within device 100 to achieve functionality. For example, one or more tasks might allow device 100 to communicate using time-division multiplexed access (TDMA) with a cellular phone network. One or more other tasks could provide a user with a phone directory including an interface for creating, modifying, organizing, searching, etc., the directory. Yet other tasks can implement a time-of-day clock, Internet web browsing, GPS position indication, calculator, email interface, etc. In general, any type of functionality can be implemented by a task. Combinations of functionality can be provided by one or more tasks. Further, a task may implement only a portion of a feature, function, or other process or functionality.

Scheduler 106 causes tasks, or portions of tasks, from task definition store 104 to be executed. Scheduler 106 can, optionally, use information provided by prioritizer 108 in determining how to specify the use of resources 110 to be used to execute a task. For example, scheduler 106 can assign all resources to a task that has been given a high priority by prioritizer 108. Conversely, scheduler 106 may reduce resources allocated to a task, or suspend execution of a task, if the task has a low priority.

Resources 110 include storage 112 and processing resources 114. Storage 112 can be, for example, system memory in the form of random-access memory (RAM), or other forms of storage. Storage 112 can be distributed throughout the processing elements, it can be centralized, or it can be a combination of centralized and distributed storage. Processing resources 114 can include one or more of common types of processing resources such as general purpose processors, FSMs, ASICs, etc. In one embodiment, processing resources 114 include multiple processing nodes according to the adaptive computing engine ("ACE") architecture as described in U.S. patent application Ser. No. 09/815,122, entitled "Adaptive Integrated Circuitry With Heterogeneous And Reconfigurable Matrices Of Diverse And Adaptive Computational Units Having Fixed, Application Specific Computational Elements," filed Mar. 22, 2001 ("Masters"). In this embodiment, each node can be of a specific type, such as math, bit/logical, FSM, or reduced-instruction set computing (RISC). In this embodiment, nodes are interconnected and may have associated resources, such as memory. A detailed description of the ACE architecture is provided in Masters, which is herein incorporated by reference in its entirety for all purposes. In other embodiments, all of the nodes may be general purpose or of one type.

Assigning Tasks for Execution

Figure 2:
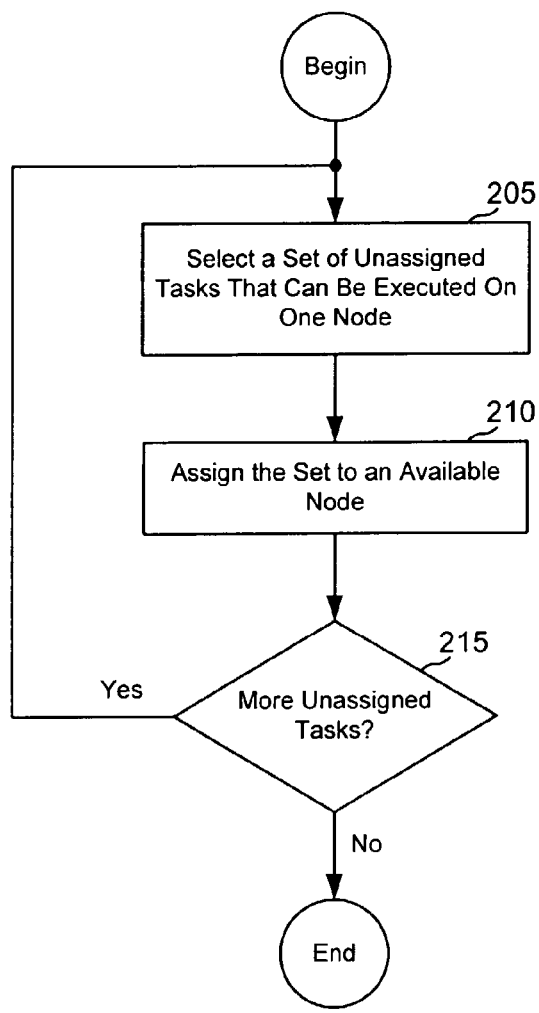
FIG. 2 is a simplified flow diagram of one embodiment of a method for scheduling tasks for execution on a plurality of nodes according to the present invention.

FIG. 2 is a simplified flow diagram illustrating, generally, one embodiment of a method for scheduling tasks for execution on a plurality of nodes according to the present invention. Method 200 may be implemented on a configurable device such as device 100 of FIG. 1. It is to be understood, however, that method 200 can be implemented on any number of devices using any number of processing approaches. For ease of explanation, method 200 will be described with reference to FIG. 1.

First, in a step 205, a set of tasks that can be executed on one node is determined. Embodiments of methods for determining such a set of tasks are described below. In one specific embodiment in which the method 200 is implemented with device 100, tasks to be assigned are stored in store 104. In this embodiment, scheduler 106 determines a set of tasks that can be executed on one of processing resources 114.

In a step 210, the set of tasks are assigned to a node that is available to execute these tasks. In the specific embodiment described above, scheduler 106 assigns the set of tasks to one of processing resources 114. In a step 215, it is determined whether more tasks need to be assigned to nodes for execution. If yes, the flow proceeds back to step 205. If no, then the flow ends. In the specific embodiment described above, scheduler 106 determines whether more tasks in store 104 need to be assigned to a processing resource 114 for execution.

Many variations of the above-described embodiment are possible. For instance, a set of tasks need not be fully determined (step 205) prior to assigning tasks to a node (step 210). Rather, the determination of the set of tasks and assignment of tasks to nodes could be done iteratively. For example, a first task could be determined to be part of a set "A" and then assigned to a node "A." Then, a second task could be determined to be part of a set "B" and then assigned to a node "B." Next, a third task could be determined to be part of set "A" and then assigned to node "A," etc.

Additionally, in some embodiments nodes of the device on which method 200 is implemented can be of different types, where only certain types of nodes are capable of executing a particular task. In these embodiments, the method 200 may include a determination of whether a particular node, because of its type, can execute a particular task. One skilled in the art will recognize many other modifications, alternatives, and equivalents.

Determining a Set of Hard Real-Time Tasks

Figure 3:
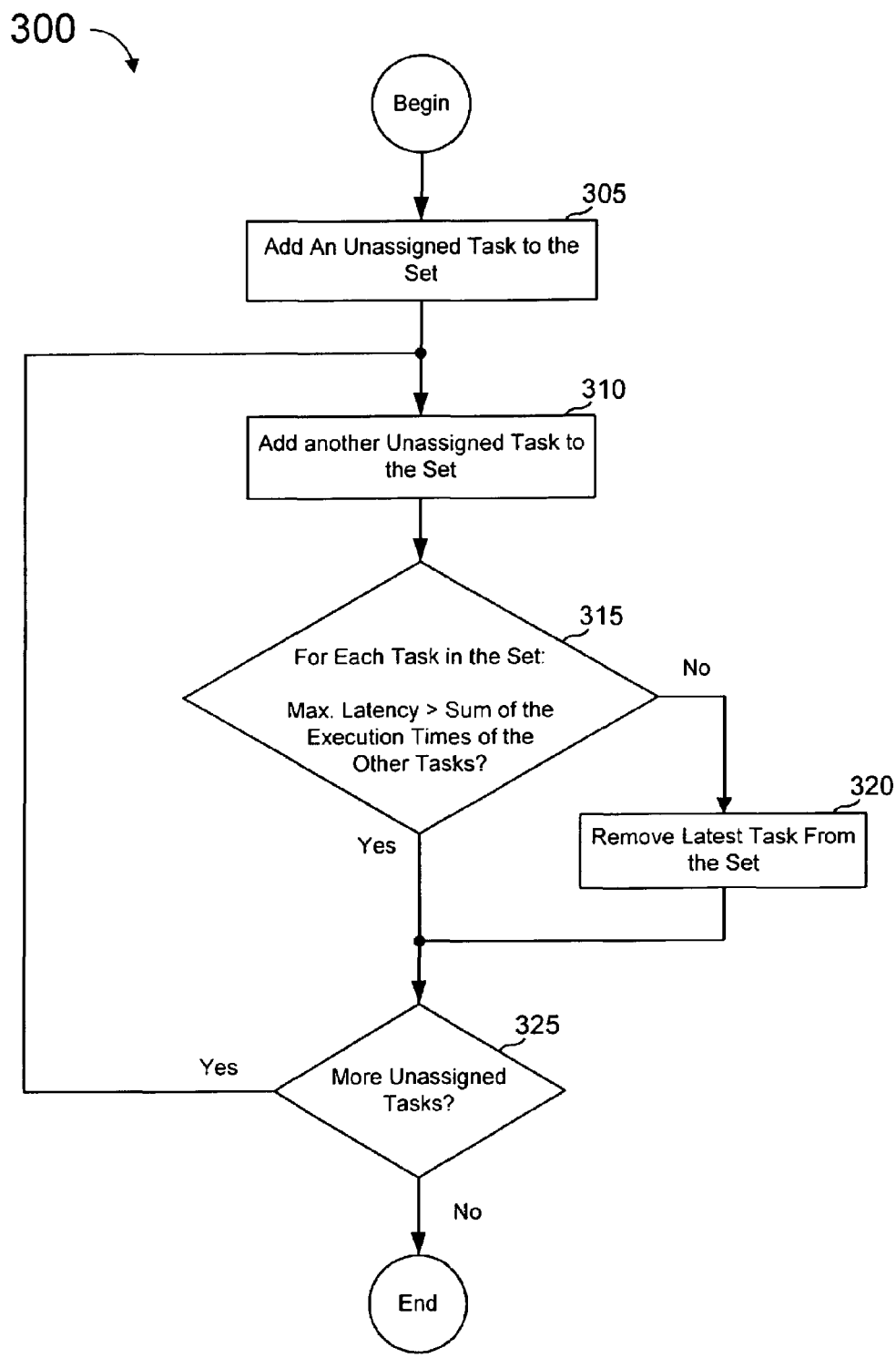
FIG. 3 is a simplified flow diagram of one embodiment of a method for selecting tasks for execution on a node according to the present invention.

FIG. 3 is a simplified flow diagram illustrating one embodiment of a method for determining a set of tasks that can be executed on a node according to the present invention. Method 300 may be implemented on a configurable device such as device 100 of FIG. 1. It is to be understood, however, that method 300 can be implemented on any number of devices using any number of processing approaches.

In method 300, it is assumed that two pieces of information are available for each task to be assigned: a maximum allowable latency and an execution time. As described above, the maximum allowable latency of a task is a maximum acceptable amount of time from when the task can begin to execute until when it actually begins to execute. The execution time is the amount of time the task will take to execute. The execution time can be an estimated, measured, or otherwise determined value. In some embodiments, the execution time is a worst case amount (i.e., the maximum amount of time the task will take to execute). In other embodiments, the execution time can be, for example, an average amount of time, a most likely amount of time, etc. The maximum allowable latency and execution time can be measured, for example, in units of time, clock cycles, etc. In some embodiments, this information is included in a task definition related to the task.

In step 305, an unassigned task is added to a set. The task added in step 305 can be, for example, chosen randomly or pseudorandomly from a group or list of unassigned tasks, the first task in an ordered list of unassigned tasks, etc. Then, in step 310, another unassigned task is added to the set. Similar to step 305, the task added in step 310 can be, for example, chosen randomly or pseudorandomly from a group or list of unassigned tasks, the next task in an ordered list of unassigned tasks, etc.

Next, in step 315 it determined whether, for each task in the set, the maximum allowable latency of that task is greater than the sum of the execution times of the other tasks in the set. If no, then in some instances the maximum allowable latency of a task may be exceeded if it is attempted to execute these tasks on one node. Thus, the flow proceeds to step 320 in which the latest task added to the set is removed from the set. Otherwise, the flow proceeds to step 325 in which it is determined whether there are more unassigned tasks. If yes, the flow proceeds back to step 310. If no, the flow ends.

The end result of method 300 is a set of tasks in which, for each task, the maximum allowable latency of the task is greater than the execution times of the other tasks. Thus, the set of tasks should be able to execute on a node without violating the maximum allowable latencies of the tasks. In some instances this set of tasks could be a plurality of tasks, and in other instances, only one task.

In some embodiments, nodes on a device on which method 300 is implemented can be of different types, where only certain types of nodes are capable of executing a particular task. In these embodiments, the method 300 may include a determination of whether the node for which the set is being assembled, because of its type, can execute a particular task. If not, then the task will not be added to the set even if step 315 were satisfied.

In other embodiments, a group of tasks that are capable of being executed by the node for which the set is being assembled is predetermined. In these embodiments, tasks selected in steps 305 and 310 can be selected from this predetermined group. One skilled in the art will recognize many other modifications, alternatives, and equivalents.

Scheduling Hard Real-Time Tasks for Execution

Referring again to FIG. 2, once a set of tasks has been determined and assigned to a node, the set of tasks can be executed by that node. The tasks can be scheduled for execution using any number of techniques. For example, in one embodiment, tasks are scheduled in a manner that does not permit preemption (i.e., once a task begins, it runs through to completion).

Figure 4:
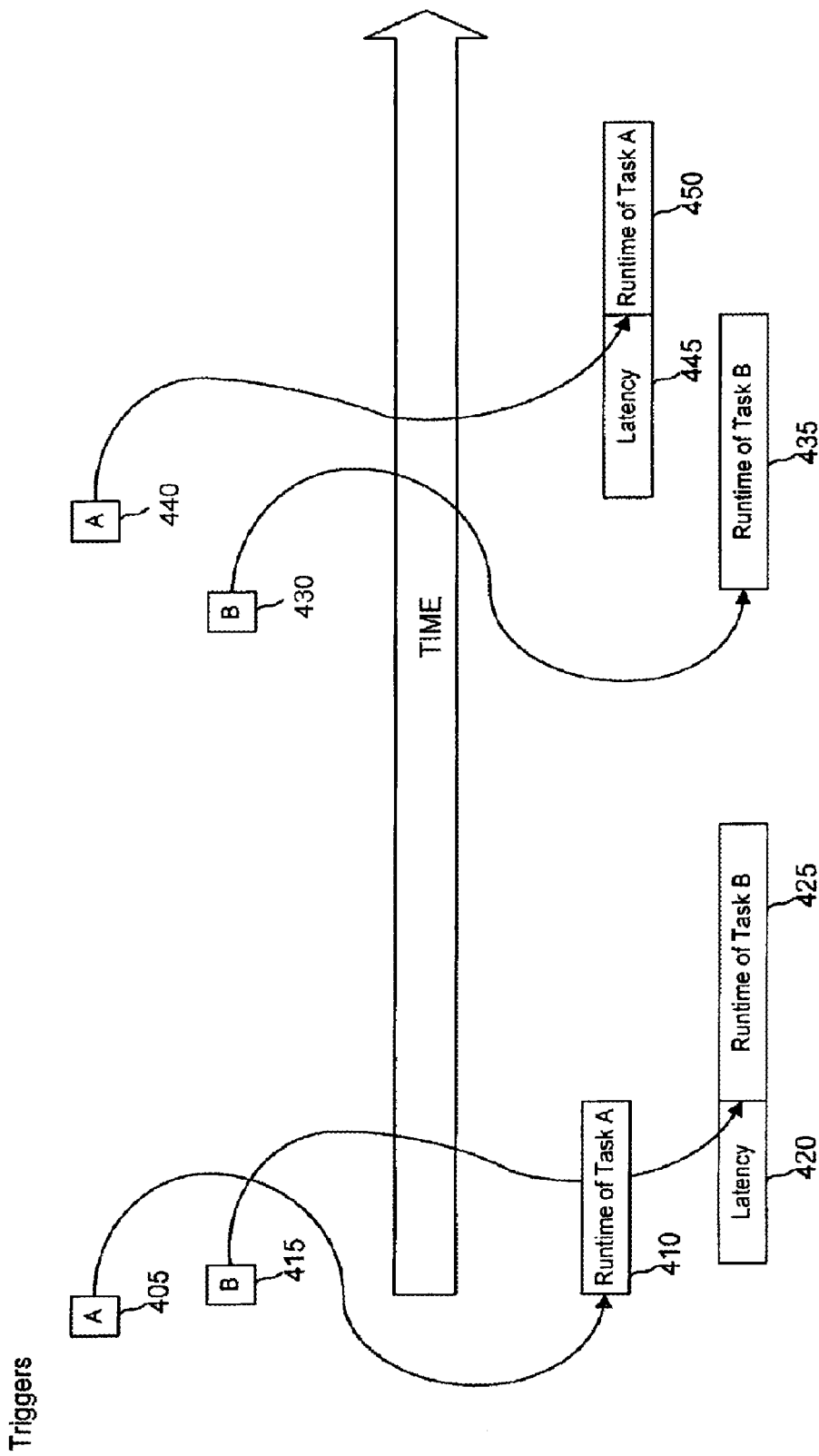
FIG. 4 is a simplified timing diagram illustrating the execution of tasks on a node.

FIG. 4 is a simplified timing diagram of an example of two tasks (task A and task B) being executed on a node without preemption. A trigger 405 for task A initiates the execution 410 of task A. Shortly after the execution 410 of task A begins, a trigger 415 for task B occurs. Because task A has already begun execution, a latency 420 for task B occurs. Once the execution 410 of task A completes, the execution 425 of task B can occur.

Later, a trigger 430 for task B initiates the execution 435 of task B. Shortly after the execution 435 of task B begins, a trigger 440 for task A occurs. Because task B has already begun execution, a latency 445 for task A occurs. Once the execution 435 of task B completes, the execution 450 of task A can occur.

Although FIG. 4 describes an embodiment in which preemption is not permitted, it is to be understood that other embodiments may permit preemption.

A Variation of Determining a Set of Hard Real-Time Tasks

Figure 5:
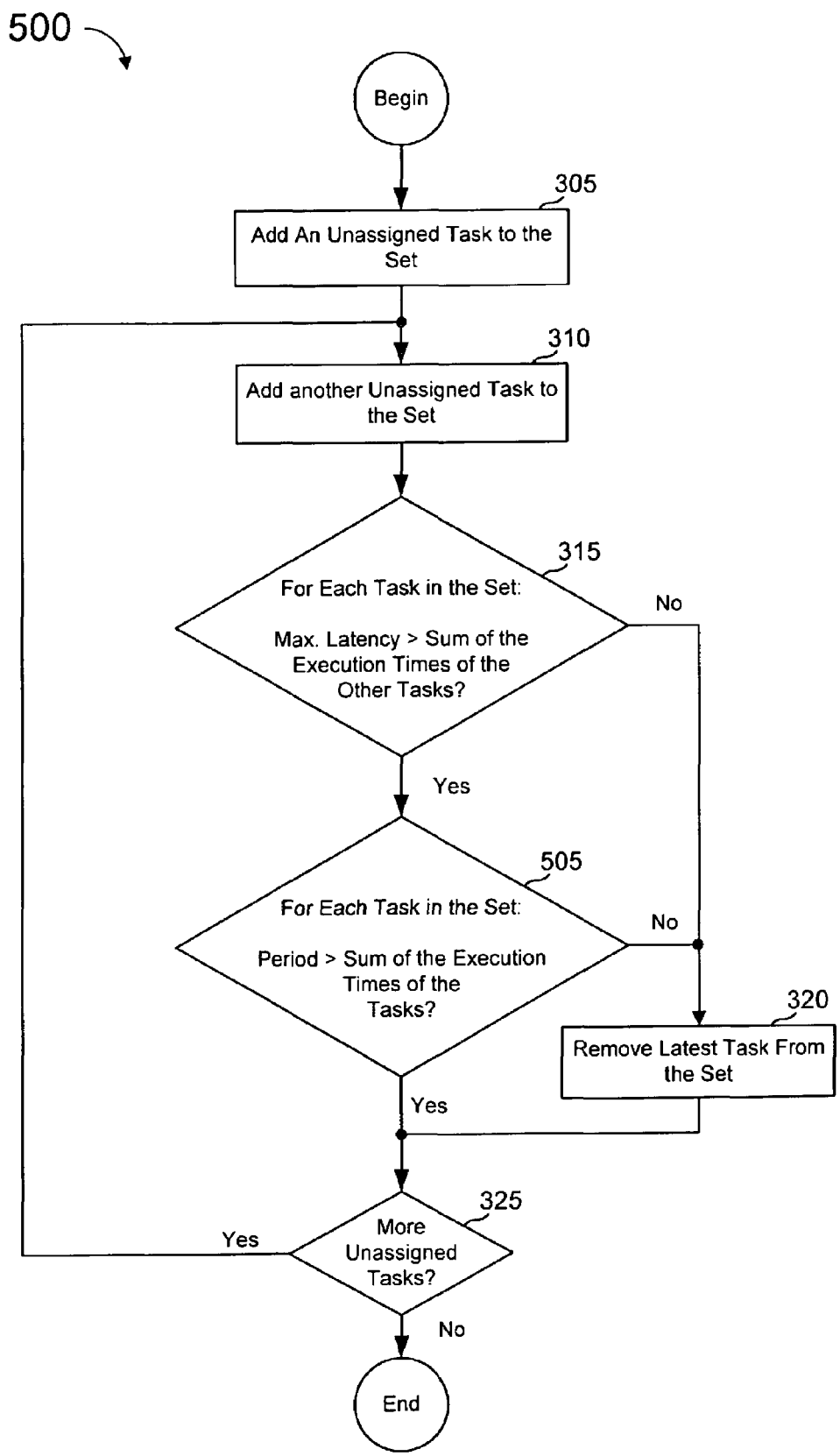
FIG. 5 is a simplified flow diagram of another embodiment of a method for selecting tasks for execution on a node according to the present invention.

FIG. 5 is a simplified flow diagram illustrating another embodiment of a method for determining a set of tasks that can be executed on a node according to the present invention. Method 500 may be implemented on a configurable device such as device 100 of FIG. 1. It is to be understood, however, that method 500 can be implemented on any number of devices using any number of processing approaches.

Similar to method 300 of FIG. 3, it is assumed that two pieces of information are available for each task to be assigned: a maximum allowable latency and an execution time. It is also assumed that an additional piece of information is available: the frequency of execution of the task. The frequency of execution of a task is a measure of how often the task must be fully executed. For example, the frequency of execution may reflect how often one batch of data must be processed by the task. The frequency of execution can be measured as a frequency or a period. For example, it can be measured in units of cycles per second, cycles per processor clock cycle, etc., or in units of time, clock cycles, etc. Additionally, the frequency of execution can be measured in terms of required node resources. For example, the frequency of execution can be measured as a percentage of processor resources, units of processor resources, etc. In some embodiments, this information is included in a task definition related to the task.

Method 500 includes the same steps as method 300 described with respect to FIG. 3. Method 500 also includes an additional step 505 that, in one embodiment, occurs after the test of step 315 is satisfied. In step 505 it determined whether, for each task in the set, the period of that task is greater than the sum of the execution times of all the tasks in the set. If no, then in some instances the maximum allowable latency of a task may be exceeded if it is attempted to execute these tasks on one node. Thus, the flow proceeds to step 320 in which the latest task added to the set is removed from the set. Otherwise, the flow proceeds to step 325.

The end result of method 500 is a set of tasks in which, for each task, the maximum allowable latency of the task is greater than the execution times of the other tasks. Additionally, for each task in the set, the period of that task is greater than the sum of the execution times of all the tasks in the set. Thus, the set of tasks should be able to execute on a node without violating the maximum allowable latencies of the tasks. In some instances this set of tasks could be a plurality of tasks, and in other instances, only one task.

As with method 300 of FIG. 3, in some embodiments nodes on a device on which method 500 is implemented can be of different types, where only certain types of nodes are capable of executing a particular task. In these embodiments, the method 500 may include a determination of whether the node for which the set is being assembled, because of its type, can execute a particular task. If not, then the set will not be added to the set even if steps 315 and 505 were satisfied. In other embodiments, a group of tasks that are capable of being executed by the node for which the set is being assembled is predetermined. In these embodiments, tasks selected in steps 305 and 315 can be selected from this predetermined group.

It is to be understood that the ordering of steps 315 and 505 is not important and can be reversed. One skilled in the art will recognize many other modifications, alternatives, and equivalents.

Determining a Set of Hard Real-Time Tasks and Soft Real-Time Tasks

Figure 6:
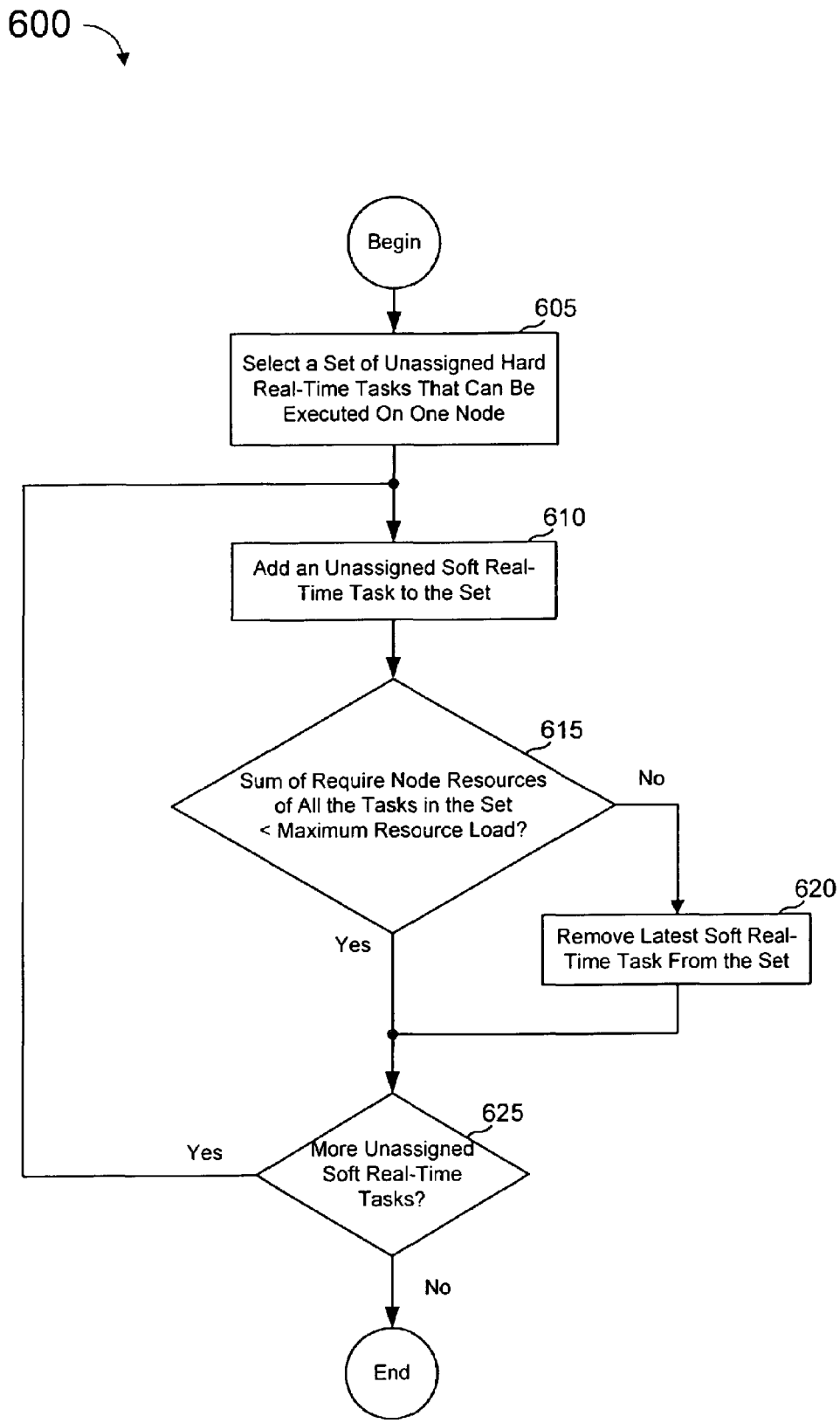
FIG. 6 is a simplified flow diagram of yet another embodiment of a method for selecting tasks for execution on a node according to the present invention.

In some embodiments, it may be desired to assign soft real-time tasks for execution on a node in addition to hard real-time tasks. FIG. 6 is a simplified flow diagram illustrating one embodiment of a method for determining a set of tasks that can be executed on a node according to the present invention. In particular, method 600 is one embodiment of a method for determining a set of hard real-time and soft real-time tasks. Method 600 may be implemented on a configurable device such as device 100 of FIG. 1. It is to be understood, however, that method 600 can be implemented on any number of devices using any number of processing approaches.

In method 600, it is assumed that a piece of information is available for each hard real-time task and each soft real-time task to be assigned: required node resources. The required processor resources is a measure of the amount of node resources required by the task. For example, the required resources could be a maximum required percentage of processor time. In some embodiments, this information is included in a task definition related to the task. In other embodiments, this information is derivable from other information known about the tasks. For example the required node resources of a task could be calculated based on its execution time and its frequency of execution, both described above.

In step 605, a set of hard real-time tasks that can be executed on one node is determined. In some embodiments, step 605 can be implemented using, for example, a method similar to method 300 or method 500 described previously. In step 610, an unassigned soft real-time task is added to the set. The task added in step 610 can be, for example, chosen randomly or pseudorandomly from a group or list of unassigned soft realtime tasks, the first task in an ordered list of unassigned soft real-time tasks, etc.

Next, in step 615 it determined whether the sum of the required node resources of all the tasks in the set is less than a maximum resource load. The maximum resource load can be a measure of a percentage of node resources below which it is desired that load of a node operates. For example, the maximum resource load could be 50% of a processor's time, 75% of a processor's time, 80%, 90%, 100%, or any other percentage that is found to be appropriate for a given node and/or application.

If the result of step 615 is no, then this set of tasks could overload the node. Thus, the flow proceeds to step 620 in which the latest soft real-time task added to the set is removed from the set. Otherwise, the flow proceeds to step 625 in which it is determined whether there are more unassigned soft real-time tasks. If yes, the flow proceeds back to step 610. If no, the flow ends. In another embodiment, after step 615 it could be checked whether the sum of the required node resources of all the tasks in the set is above some threshold. If yes, the flow ends. If no, the flow proceeds to step 625.

The end result of method 600 is a set of tasks in which the sum of the required node resources of all the tasks in the set is less than a maximum resource load. Thus, the set of tasks should be able to execute on a node without overloading the node. In some instances this set of tasks could include a plurality of soft real-time tasks. In other instances, this set of tasks could include only one soft real-time task, or even no soft real-time tasks.

As with methods 300 and 500 described above, in some embodiments, nodes on a device on which method 600 is implemented can be of different types, where only certain types of nodes are capable of executing a particular task. In these embodiments, the method 600 may include a determination of whether the node for which the set is being assembled, because of its type, can execute a particular soft-real time task. If not, then the task will not be added to the set even if step 615 were satisfied.

In other embodiments, a group of tasks that are capable of being executed by the node for which the set is being assembled is predetermined. In these embodiments, tasks selected in steps 605 and 610 can be selected from this predetermined group. One skilled in the art will recognize many other modifications, alternatives, and equivalents.

Scheduling Hard Real-Time and Soft-Real Time Tasks for Execution

Referring again to FIG. 2, once a set of hard real-time and soft real-time tasks has been determined and assigned to a node, the set of tasks can be executed by that node. The tasks can be scheduled for execution using any number of techniques. For example, in one embodiment, hard real-time tasks are scheduled in a manner that does not permit preemption, whereas soft real-time tasks are permitted to be preempted.

Figure 7:
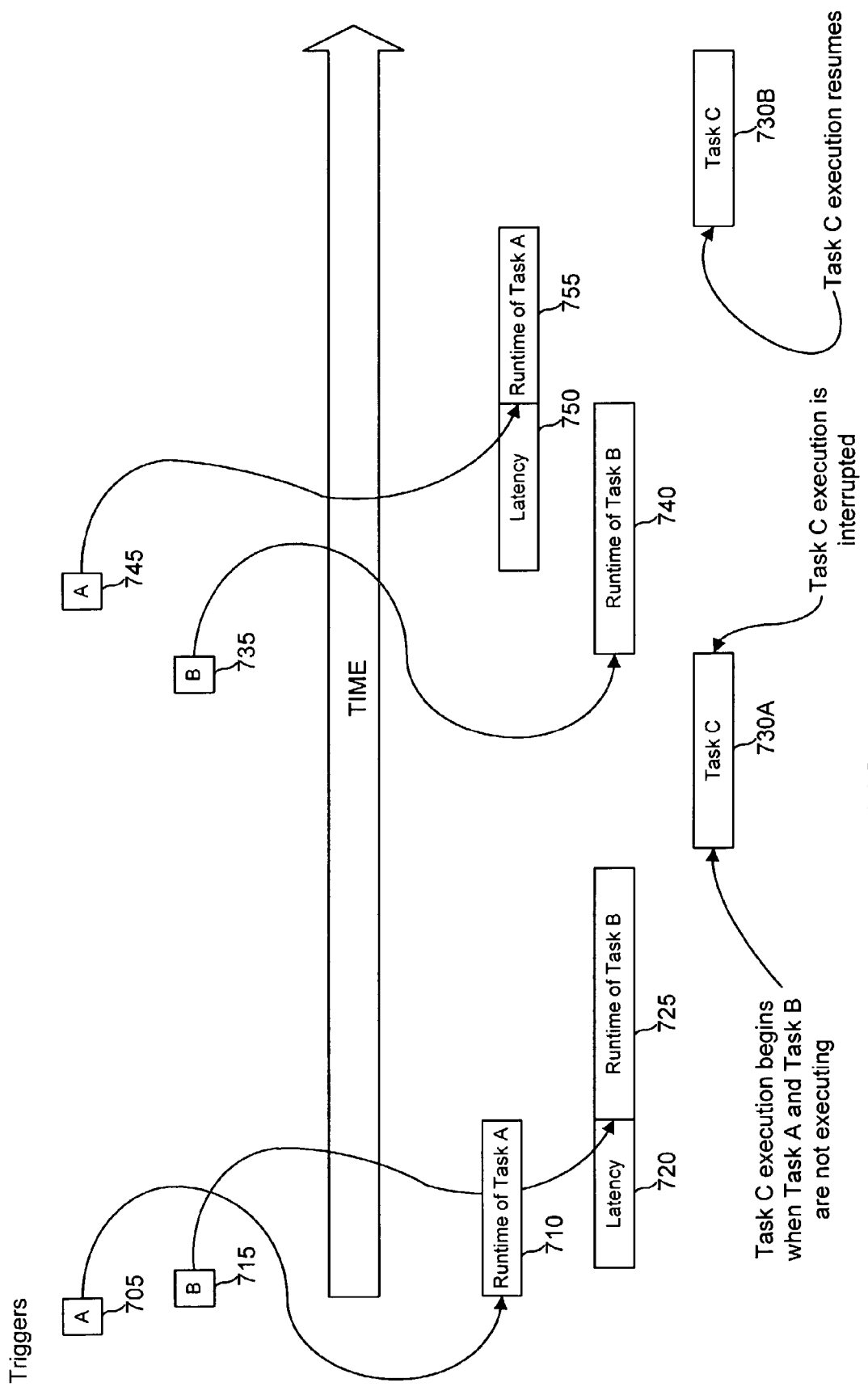
FIG. 7 is a simplified timing diagram illustrating the execution of tasks on a node.

FIG. 7 is a simplified timing diagram of an example of two hard real-time tasks (task A and task B) and one soft real-time task (task C) being executed on a node, where tasks A and B cannot be preempted, but task C can be. A trigger 705 for hard real-time task A initiates the execution 710 of hard real-time task A. Shortly after the execution 710 of hard real-time task A begins, a trigger 715 for hard real-time task B occurs. Because hard realtime task A has already begun execution, a latency 720 for hard real-time task B occurs. Once the execution 710 of hard real-time task A completes, the execution 725 of hard realtime task B can occur.

Later, soft real-time task C begins execution 730A. Then, a trigger 735 for hard realtime task B initiates the preemption of soft real-time task C and the execution 740 of hard real-time task B. Shortly after the execution 740 of hard real-time task B begins, a trigger 745 for hard real-time task A occurs. Because hard real-time task B has already begun execution, a latency 750 for hard real-time task A occurs. Once the execution 740 of hard real-time task B completes, the execution 755 of hard real-time task A can occur. Finally, once the execution 755 of hard real-time task A finishes, the execution 730B of soft real-time task C can resume.

In some embodiments, preemption of hard real-time tasks is not permitted, while preemption of soft-real time tasks is permitted. In one specific embodiment, soft real-time tasks are executed based on a fixed priority system. In another embodiment, soft real-time tasks are executed based on a priority system that provides temporal protection based on fairness.

In other embodiments, preemption of hard real-time tasks is permitted by other hard real-time tasks, whereas soft real-time task cannot preempt hard real-time tasks. One skilled in the art will recognize many other modifications, alternatives, and equivalents.

While the above is a full description of the specific embodiments, various modifications, alternative constructions, and equivalents may be used. Therefore, the above description and illustrations should not be taken as limiting the scope of the present invention which is defined by the appended claims.

What is claimed is:

1. A method of selecting tasks to assign to a processing node, the method comprising:

receiving a plurality of indications of execution times corresponding to a first plurality of tasks, each of the tasks comprising processing an incoming data block;

receiving a plurality of indications of maximum allowable latencies corresponding to the first plurality of tasks;

receiving an indication of a period of execution corresponding to each of the first plurality of tasks, wherein the periods of execution corresponds to how long each of the tasks must be executed to process one of the incoming data blocks; and selecting at least a subset of first plurality of tasks to assign to the processing node based on the plurality of indications of execution times, the plurality of indications of maximum allowable latencies and the indication of the period of execution of each of the first plurality of tasks such that the subset of the first plurality of tasks are executable on the processing node without violating the maximum allowable latencies of each task within the subset of the first plurality of tasks, wherein for each task to be added to the subset, the period of the task to be added must be greater than the sum of the execution times of the tasks already included in the subset.

2. The method of claim 1, wherein selecting at least the subset of the first plurality of tasks includes determining one or more of the first plurality tasks such that the period of execution of any of the one or more tasks does not exceed the sum of the execution times of the one or more tasks.

3. The method of claim 1, further comprising:

receiving a first plurality of indications of required node resources corresponding to the first plurality of tasks;

receiving a second plurality of indications of required node resources corresponding to a second plurality of tasks; and selecting at least a subset of the second plurality of tasks for execution on the processing node based on the first and second plurality of indications of required node resources.

4. The method of claim 3, wherein selecting at least the subset of the second plurality of tasks includes determining zero or more of the second plurality tasks such that a total resources load of the subset of the first plurality of tasks and the zero or more of the second plurality of tasks is less than a maximum resources load.

5. A method as claimed in claim 3, wherein the first plurality of different tasks comprise hard tasks that must be executed within a fixed time period and the second plurality of tasks comprises soft tasks that can be executed at any time, and wherein each of the second plurality of tasks are assigned to one of the nodes only after all the first plurality of tasks are assigned.

6. The method of claim 1, wherein selecting at least the subset of the first plurality of tasks includes determining whether the processing node is capable of executing each task in the subset of the first plurality of tasks.

7. The method of claim 1, wherein the processing node is one of a plurality of processing nodes on a configurable device.

8. A method as claimed in claim 1, wherein both the maximum allowable latency of each task to be added to the subset and the period of the task to be added are compared to the same sum of execution times of the task already in subset.

9. A method of selecting tasks for execution on a processing node, the method comprising:
receiving a plurality of indications of execution times corresponding to a first plurality of tasks and a second plurality of tasks;
receiving a plurality of indications of maximum allowable latencies corresponding to the first plurality of tasks and the second plurality of tasks;
receiving a plurality of indications of required node resources corresponding to the first plurality of tasks and the second plurality of tasks;
receiving a plurality of indications of periods of execution corresponding to the first plurality of tasks and the second plurality of tasks and the plurality of indications of the periods of execution
selecting at least a subset of the first plurality of tasks and the second plurality of tasks for execution on the processing node based on the plurality of indications of execution times, the plurality of indications of maximum allowable latencies, the plurality of indications of required node resources such that the subset of the first plurality of tasks and the second plurality of tasks are executable on the processing node without violating the maximum allowable latencies of the subset of the first plurality of tasks and the second plurality of tasks by determining one or more of the first plurality of tasks such that the maximum allowable latency of any of the one or more tasks does not exceed the sum of the execution times of the other one or more tasks which are assigned to the subset, if any;
wherein for each task to be added to the subset, the period of the task to be added must be greater than the sum of the execution times of the tasks already included in the subset.

10. The method of claim 9, wherein selecting at least a subset includes determining one or more of the first plurality tasks such that the period of execution of any of the one or more fist plurality of tasks does not exceed the sum of the execution times of the one or more first plurality of tasks.

11. The method of claim 9, wherein selecting at least a subset includes determining one or more of the first plurality of tasks and the second plurality tasks such that a total resource load of the subset of the first plurality of tasks and the second plurality of tasks is less than a maximum resource load.

12. The method of claim 9, wherein the processing node is one of a plurality of processing nodes of a configurable device.

13. A method as claimed in claim 9, wherein the first plurality of different tasks comprise hard tasks that must be executed within a fixed time period and the second plurality of tasks comprises soft tasks that can be executed at any time,
and wherein each of the second plurality of tasks are assigned to one of the nodes only after all the first plurality of tasks are assigned.

14. A method as claimed in claim 9, wherein both the maximum allowable latency of each task to be added to the subset and the period of the task to be added are compared to the same sum of execution times of the task already in subset.

15. A processing device having a plurality processing nodes for executing a plurality of tasks, the processing device comprising:
a memory for storing a plurality of indications of execution times of at least a first plurality of tasks a plurality of indications of maximum allowable latencies and a frequency of execution of at least the first plurality of tasks of at least the first plurality of tasks; and
a scheduler that determines corresponding sets of the plurality of tasks for execution by the plurality of processing nodes; and
wherein at least one of the corresponding sets is determined based on the plurality of indications of execution times, the plurality of indications of maximum allowable latencies and the indications of frequency of execution such that tasks in the at least one of the corresponding sets of the plurality of tasks are executable on the processing node without violating the plurality of indications of maximum allowable latencies of the at least one of the corresponding sets of the plurality of tasks by determining one or more of the first plurality of tasks such that the maximum allowable latency of any of the one or more tasks does not exceed the sum of the execution times of the other one or more tasks which are assigned to the subset, if any;
wherein for each task to be added to the subset, the period of the task to be added must be greater than the sum of the execution times of the tasks already included in the subset.

16. The processing device of claim 15, wherein the memory additionally stores a first plurality of indications of required node resources corresponding to the first plurality of tasks and a second plurality of indications of required node resources corresponding to a second plurality of tasks, and wherein at least one of the corresponding sets is determined based on the first plurality of indications of required node resources and the second plurality of indications of required node resources.

17. The processing device of claim 16, wherein the first plurality of different tasks comprise hard tasks that must be executed within a fixed time period and the second plurality of tasks comprises soft tasks that can be executed at any time,
and wherein each of the second plurality of tasks are assigned to one of the nodes only after all the first plurality of tasks are assigned.

18. A processing device of claim 15, wherein both the maximum allowable latency of each task to be added to the subset and the period of the task to be added are compared to the same sum of execution times of the task already in subset.

19. A computer program product comprising:
a computer readable storage medium having computer program code embodied therein for selecting tasks for execution on a processing node, the computer program code comprising:

code for receiving a plurality of indications of execution times corresponding to a first plurality of tasks and a second plurality of tasks;

code for receiving a plurality of indications of maximum allowable latencies corresponding to the first plurality of tasks and the second plurality of tasks;

code for receiving a plurality of indications of required node resources corresponding to the first plurality of tasks and the second plurality of tasks;

code for receiving a plurality of periods of execution of at least the first plurality of tasks; and code for selecting at least a subset of the first plurality of tasks and the second plurality of tasks for execution on the processing node based on the plurality of indications of execution times, the plurality of indications of maximum allowable latencies, and the plurality of indications of required node resources and the plurality of indications of periods of execution such that the subset of the first plurality of tasks and the second plurality of tasks are executable on the processing node without violating the maximum allowable latencies of the subset of the first plurality of tasks and the second plurality of tasks by determining one or more of the first plurality of tasks such that the maximum allowable latency of any of the one or more tasks does not exceed the sum of the execution times of the other one or more tasks which are assigned to the subset, if any;

wherein for each task to be added to the subset, the period of the task to be added must be greater than the sum of the execution times of the tasks already included in the subset.

20. A computer program product as claimed in claim 19, wherein both the maximum allowable latency of each task to be added to the subset and the period of the task to be added are compared to the same sum of execution times of the task already in subset.

* * * * *